(12) United States Patent
Johnson (10) Patent No.: US 6,625,963 B2
(45) Date of Patent: Sep. 30, 2003

(54) REVERSE LOCKOUT FEATURE FOR A MOWER

(75) Inventor: Kevin L. Johnson, Salem, IN (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/963,059

(22) Filed: Sep. 25, 2001

(65) Prior Publication Data

US 2003/0056480 A1 Mar. 27, 2003

(51) Int. Cl.[7] ............................................. A01D 69/00
(52) U.S. Cl. ....................................................... 56/10.8
(58) Field of Search ........................... 56/10.5, 10.8, 56/11.3, 11.2, 16.7, DIG. 15, 10.2 R, 10.2 A; 74/473.11; 180/6.48, 6.5, 733

(56) References Cited

U.S. PATENT DOCUMENTS

| | | | |
|---|---|---|---|
| 3,984,967 A | 10/1976 | Jones | 56/11.8 |
| 3,999,643 A | 12/1976 | Jones | 192/52 |
| 4,352,302 A * | 10/1982 | McAuliffe et al. | 74/473.11 |
| 6,026,634 A | 2/2000 | Peter et al. | 56/10.8 |
| 6,109,010 A | 8/2000 | Heal et al. | 56/10.8 |
| 6,237,311 B1 * | 5/2001 | Richards | 56/10.5 |
| 6,405,513 B1 * | 6/2002 | Hancock et al. | 56/10.8 |

FOREIGN PATENT DOCUMENTS

| | | |
|---|---|---|
| EP | 0343002 | 11/1989 |
| EP | 0589145 | 3/1994 |

* cited by examiner

*Primary Examiner*—Robert E. Pezzuto
(74) *Attorney, Agent, or Firm*—Baker & Daniels

(57) ABSTRACT

A lawn mower including a frame, an engine having an electrical system and attached to the frame, a mower deck assembly connected to the frame and having a rotating blade selectively engaged with the engine, a reversible transmission driven by the engine and having a shift mechanism having forward and reverse positions, a switch in electrical communication with the electrical system and mower deck assembly, and a solenoid attached to the transmission, in electrical communication with the switch, and having a plunger. The plunger has an extended position when the switch is in its first position and the blade engages the engine, wherein the plunger blocks movement of the shift mechanism into its reverse position, and a retracted position when the switch is in its second position and the blade disengages the engine, wherein the plunger does not block movement of the shift mechanism into its reverse position.

7 Claims, 8 Drawing Sheets

FIG_1

FIG_8

FIG_9

FIG_10

REVERSE LOCKOUT FEATURE FOR A MOWER

BACKGROUND OF THE INVENTION

The present invention relates to garden tractors, riding lawnmowers, and the like, specifically to means for preventing a mower from being shifted into reverse when the mower deck is operating, in conformance with certain proposed industry standards.

Riding mowers, including most lawn tractors and garden tractors, include potentially dangerous rotating blades which comprise part of the mower deck and which may cause injury to the operator or another person. New industry standards are being considered which are aimed toward the prevention of such injuries, and safety devices are now being, or will likely be, included on riding mowers in support of these goals. Various types of these devices prevent operation of the mower deck while the mower is being reversed, or prevent the mower from being reversed while the mower deck is in operation.

Some of these previous devices will automatically shut off the engine if the mower is reversed while the mower deck is engaged. Such action is inconvenient since the operator would then need to restart the mower. Often, an operator will unintentionally put the mower in reverse with the mower deck engaged, such as when the operator realizes that he just passed an area to be mowed and, without thinking, shifts the mower into reverse to mow that area, consequently killing the engine.

Other previous safety devices include an engine kill relay with an override switch which allow the operator to reverse the mower with the mower deck operating only when the override switch is engaged simultaneously with the reverse gear being selected (U.S. Pat. No. 6,109,010). However, if the override switch is not engaged, shifting into reverse causes the engine to be shut off through the kill relay. In operation, the current path between a kill relay and a ground terminal is terminated if a reverse switch is opened and the PTO switch is turned on, thereby terminating engine operation. However, if the override switch is actuated, then as long as the PTO switch is turned on, current will be maintained between the relay and ground. Thus, the override switch eliminates the capability of breaking the current path and terminating engine operation if the mower is shifted into reverse with the mower deck operating, thereby allowing for potential unsafe operation of the mower. Further, such systems require operator manipulation of multiple controls in order to actuate the override switch before shifting into reverse.

Other safety devices require the operator to depress and hold down a button, or pull out a device, while shifting the mower into reverse, thereby requiring simultaneous manipulation of multiple controls by the operator to both deactivate the safety device and shift the mower into reverse. These devices are thus inconvenient and may allow potentially unsafe operation of the mower.

While these previous devices eliminate the possibility of an operator unintentionally shifting the mower into reverse since the operator would need to manipulate several controls to do so, these devices are rather inconvenient to operate and not intuitively operable by an operator unfamiliar with such controls. Further, potentially unsafe mower operation may be accommodated through such override devices.

Other attempts to address the issue of preventing the mower from being reversed with the mower deck operating include the use of mechanical safety interlocks which rotate an arm into a blocking position in the shifting rod slot when the mower deck is engaged (U.S. Pat. No. 3,984,967), and thereby preventing the operator from shifting the mower into reverse. Such devices are cumbersome and expensive.

Still other attempts to address this issue include an electrical interlock system in which an electric circuit and switch are opened to de-energize an electromagnetic clutch to automatically disconnect the mower drive when the mower is shifted into reverse (U.S. Pat. Nos. 3,999,643 and 6,026,634). Automatically disconnecting power to the mower deck also inconveniences the operator, who would need to reconnect power to the mower deck. Additionally, such systems are applicable only to mowers having electromagnetic blade engagement clutches, not mechanical clutches such as, for example, a belt tensioner. Thus, such systems may not be used on mowers in which the mower deck is engaged through a non-electrical clutch.

It is desirable to provide a device by which the mower is prevented from being reversed while the mower deck is operating without shutting off the engine, and to provide such a device which may be incorporated into all riding mowers, not just those in which the mower deck is electrically engaged.

SUMMARY OF THE INVENTION

The present invention provides a lawn mower including a frame, an engine having an electrical system and attached to the frame, a mower deck assembly having a rotating blade and connected to the frame, the blade selectively engaged with the engine, a reversible transmission driven by the engine and having a shift mechanism having a forward and a reverse position, a switch in electrical communication with the electrical system and mower deck assembly, and a solenoid attached to the transmission and in electrical communication with the switch and having a plunger. The switch is in a first position when the blade is in engagement with the engine and in a second position when the blade is out of engagement with the engine. The plunger is in an extended position when the switch is in its first position wherein movement of the shift mechanism into its reverse position is blocked by the plunger, and is in a retracted position when the switch is in its second position wherein movement of the shift mechanism into its reverse position is not blocked by the plunger.

The present invention further provides a reversible transmission for a lawn mower including a housing, an input shaft and an output shaft rotatably supported in the housing, an operator controlled shift mechanism having a forward position and a reverse position, and a solenoid connected to the housing and having a plunger. The plunger has an extended position wherein movement of the shift mechanism into its reverse position is blocked by the plunger, and a retracted position wherein movement of the shift mechanism into its reverse position is not blocked by the plunger.

The present invention also provides a reverse shift lockout system for a lawn mower including an engine, a transmission having a selectively entered reverse condition and a selectively entered forward condition and driven by the engine, an electrical source, a mower deck assembly selectively engaged with the engine, a switch in electrical communication with the electrical source and the mower deck assembly and being in a first position when the mower deck assembly is engaged and in a second position when the mower deck assembly is not engaged, and means in communication with the switch for preventing the transmission from entering its reverse condition when the switch is in its first position and permitting the transmission to enter its reverse condition when the switch is in its second position.

The present invention also provides a method of preventing an operator from placing a mower in reverse when its mower deck is operating, including extending the solenoid plunger in response to the mower deck being engaged, blocking movement of a transmission shift mechanism into reverse with the extended solenoid plunger, whereby the mower cannot be placed in reverse with the mower deck being engaged, and retracting the solenoid plunger in response to the mower deck being disengaged, whereby the mower may be placed in reverse.

The present invention also provides a lawn mower including a frame, an engine having an electrical system and attached to the frame, a mower deck assembly connected to the frame and having a rotating blade being selectively engaged with the engine, a reversible transmission driven by the engine and having a shift mechanism having a forward position and a reverse position, and means for preventing the shift mechanism from being shifted into its reverse position when the blade is in engagement with the engine.

The present invention also provides a reversible transmission for a lawn mower having a selectively engaged mower deck including a housing, an input shaft and an output shaft rotatably supported in the housing, an operator controlled shift mechanism having a forward position and a reverse position, and means for preventing the transmission from being shifted into reverse in response to the mower deck being engaged.

The present invention is advantageous in that the need to kill the engine upon placing the mower in reverse while the mower deck is operating has been eliminated since the operator is physically unable to shift the mower into reverse when the mower deck is operating. With this elimination, the operator avoids possibility of the engine dying and the inconvenient task of restarting the engine. In addition, the present invention prevents an operator from unintentionally placing the mower in reverse with the mower deck operating since it is physically impossible to do so. The present invention also enjoys wide applicability to various mower designs because it may be used with various electrical or mechanical means for engaging the mower deck to the engine. Furthermore, the present invention substantially operates at all times and has no override mechanism. Therefore, the potential for unsafe mower operation is mitigated.

BRIEF DESCRIPTION OF THE DRAWINGS

The above mentioned and other features and objects of this invention will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended.

Figure 1:
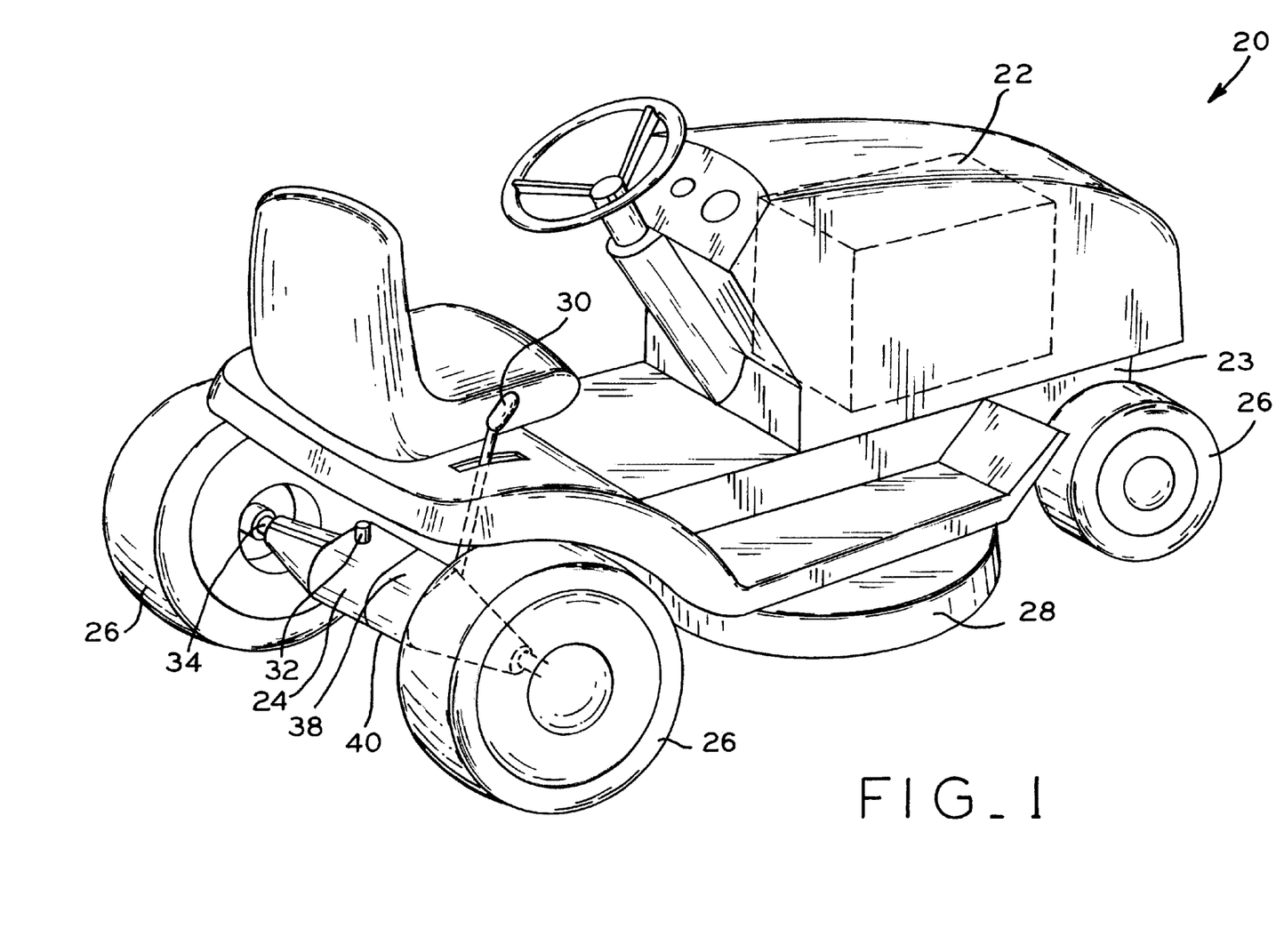
FIG. 1 is a perspective view of a riding lawnmower having the inventive reverse lockout feature incorporated therein.

Referring first to FIG. 1, mower 20 has engine 22 mounted to frame 23 and mower deck assembly 28 mounted on the frame's underside. In the rear of mower 20 is transaxle 24 having axle 34, at the ends of which are mounted ground engaging wheels 26. Two ground engaging wheels 26 are also located at the front of mower 20. Attached to transaxle 24 is solenoid 32 having plunger 74 (FIG. 3) which interacts with a shifting mechanism within the transaxle housing as described hereinbelow. An operator conventionally operates transaxle 24 through manual shift lever 30 which extends from transaxle 24.

Figure 2:
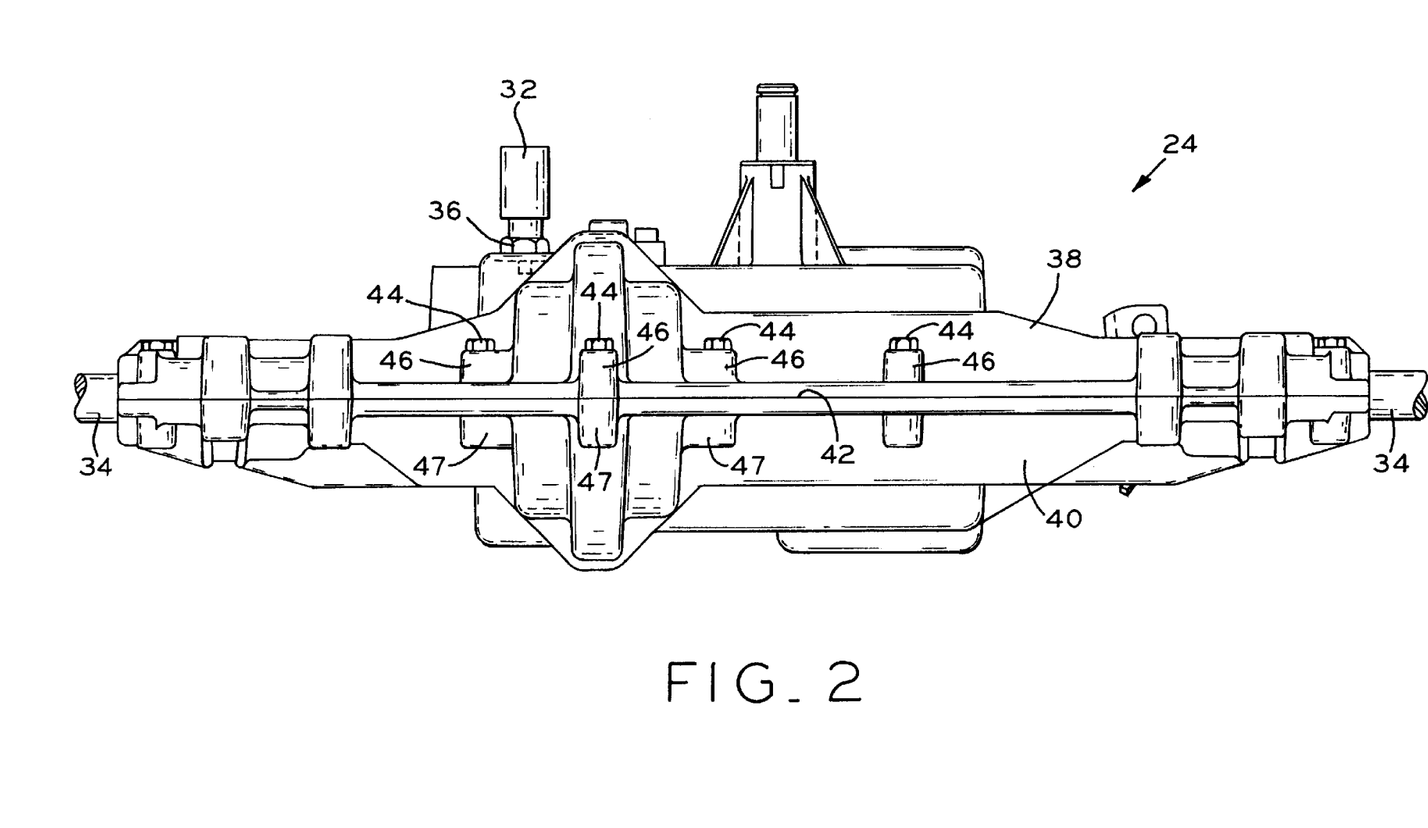
FIG. 2 is a rear view of a manual shift transaxle including the solenoid of the inventive reverse lockout feature.
Figure 3:
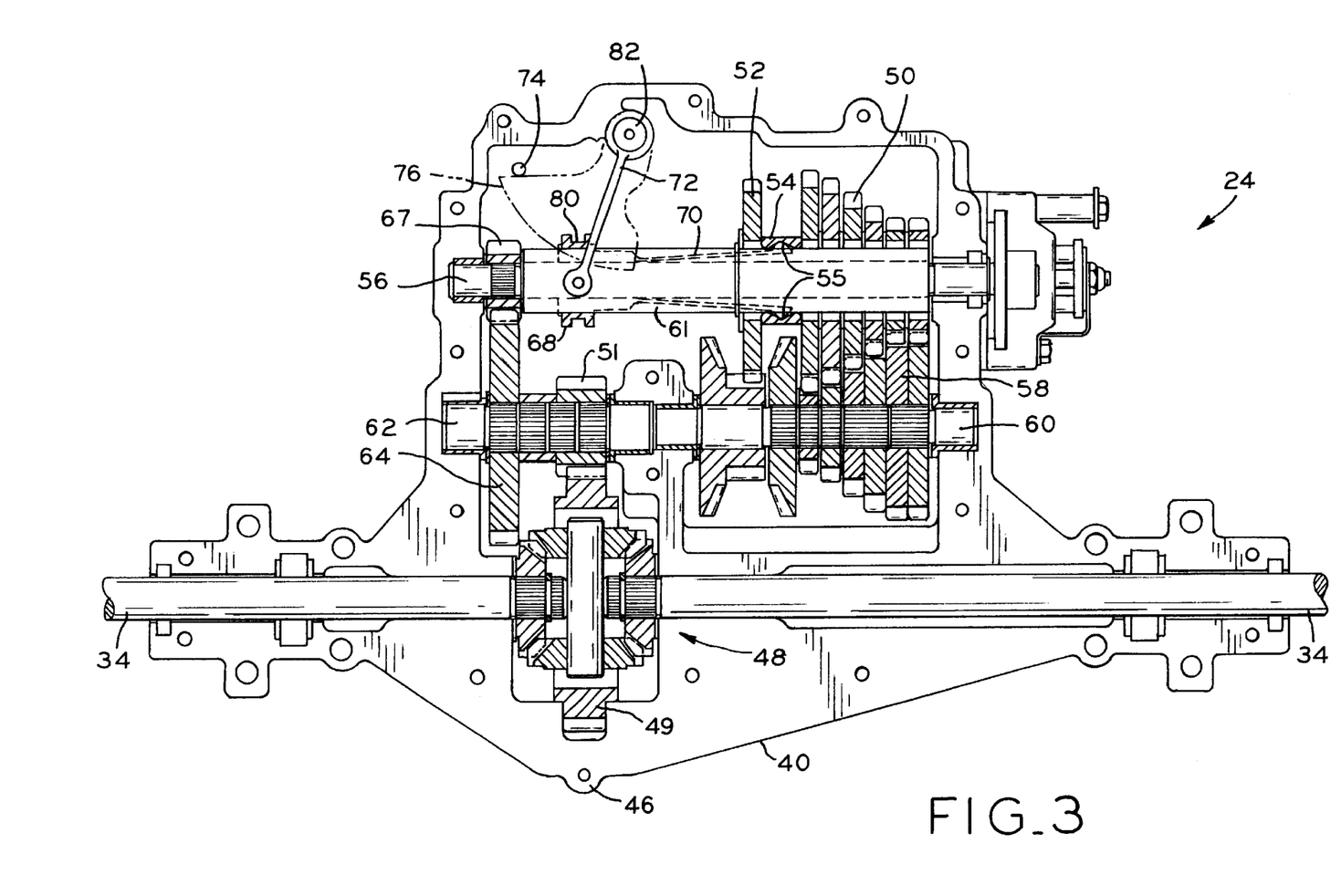
FIG. 3 is a top sectional view of the transaxle of FIG. 2.

As shown in FIGS. 1, 2, and 3, transaxle 24 is a manual shift transmission, such as that disclosed in U.S. Pat. No. 5,287,769, issued Feb. 22, 1994, U.S. Pat. No. 4,966,574, issued Oct. 30, 1990, and U.S. Pat. No. 4,791,825, issued Dec. 20, 1988, all of which are assigned to the assignee of the present invention, the complete disclosures of which are expressly incorporated herein by reference.

Referring now to FIG. 2, a rear exterior view of transaxle 24 is shown, with transaxle 24 having two casing halves, upper casing half 38 and lower casing half 40, which abut at horizontal interface 42. Upper casing half 38 and lower casing half 40 are joined together through the use of bolts 44 inserted through bosses 46 on the upper casing half 38, and threaded into bosses 47 on the lower casing half 40. As can be seen, a portion of axle 34, which is supported by the transaxle casing, extends from either end of transaxle 24 to be attached to a ground engaging wheel 26. Solenoid 32 is threaded into an aperture in upper casing half 38, and secured by lock nut 36.

Transaxle 24 is shown in a sectional top view in FIG. 3, and further includes conventional, known differential mechanism 48 through which the two respective portions of axle 34 are coupled to the geartrain. Ring gear 49 of differential 48, intermeshes with gear 51 mounted on shaft 62 to transfer motion from the rest of the geartrain to differential 48. Within transaxle 24, input gearset 58 is fixedly mounted on shaft 60 and intermeshes with output gearset 50, comprising gears which are individually rotatably mounted on shaft 56. Gearsets 50 and 58 each include a plurality of gears of varying diameters. One forward gear of output gearset 50 is selected to obtain one of a plurality of forward speeds when operating mower 20. Also rotatably mounted on shaft 56 are reverse gear 52 and neutral spacer 54. Mounted on shaft 62 is gear 64 intermeshing with small gear 67 mounted on shaft 56.

Surrounding shaft 56 and extending through the forward gears of gearset 50, gear 52, and spacer 54, is sleeve 66 having key 70 disposed therein and in communication with shift collar 68. Key 70 moves to engage the gear or spacer selected by the operator, by using manual shift mechanism 30 (FIG. 1) to select reverse, neutral or one of the forward speeds. As can be seen, each gear 50, 52, or spacer 54 is provided with recesses 55 in which the tines of key 70 are received to select that particular gear or spacer.

Figures 4, 5:
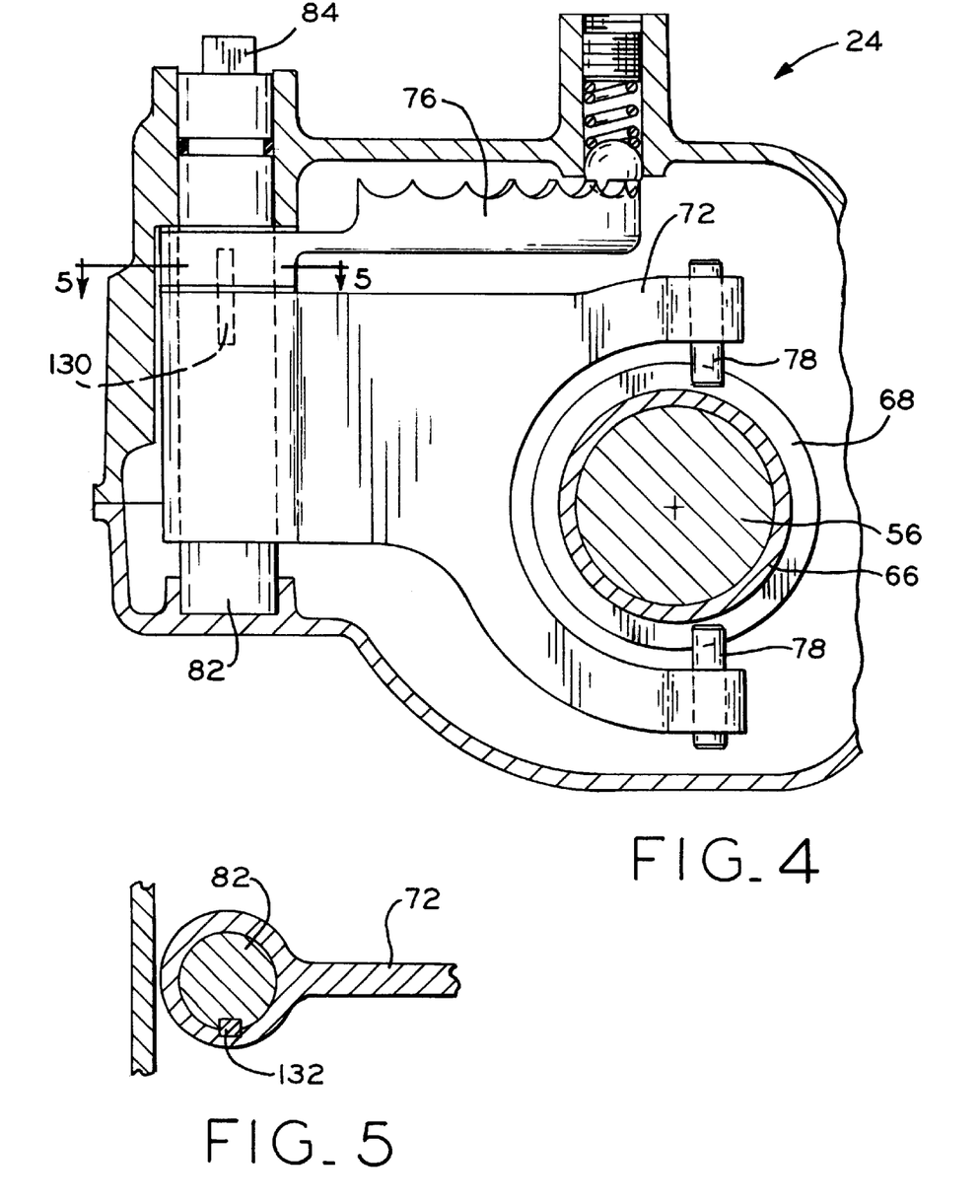
FIG. 4 is an enlarged fragmentary view of the shift fork and plate arrangement of the manual shift transmission of FIG. 3 showing the common connection to the rotatable shaft.
FIG. 5 is a sectional view along line 5—5 of FIG. 4, showing the shift fork keyed to the shaft.
Figure 6:
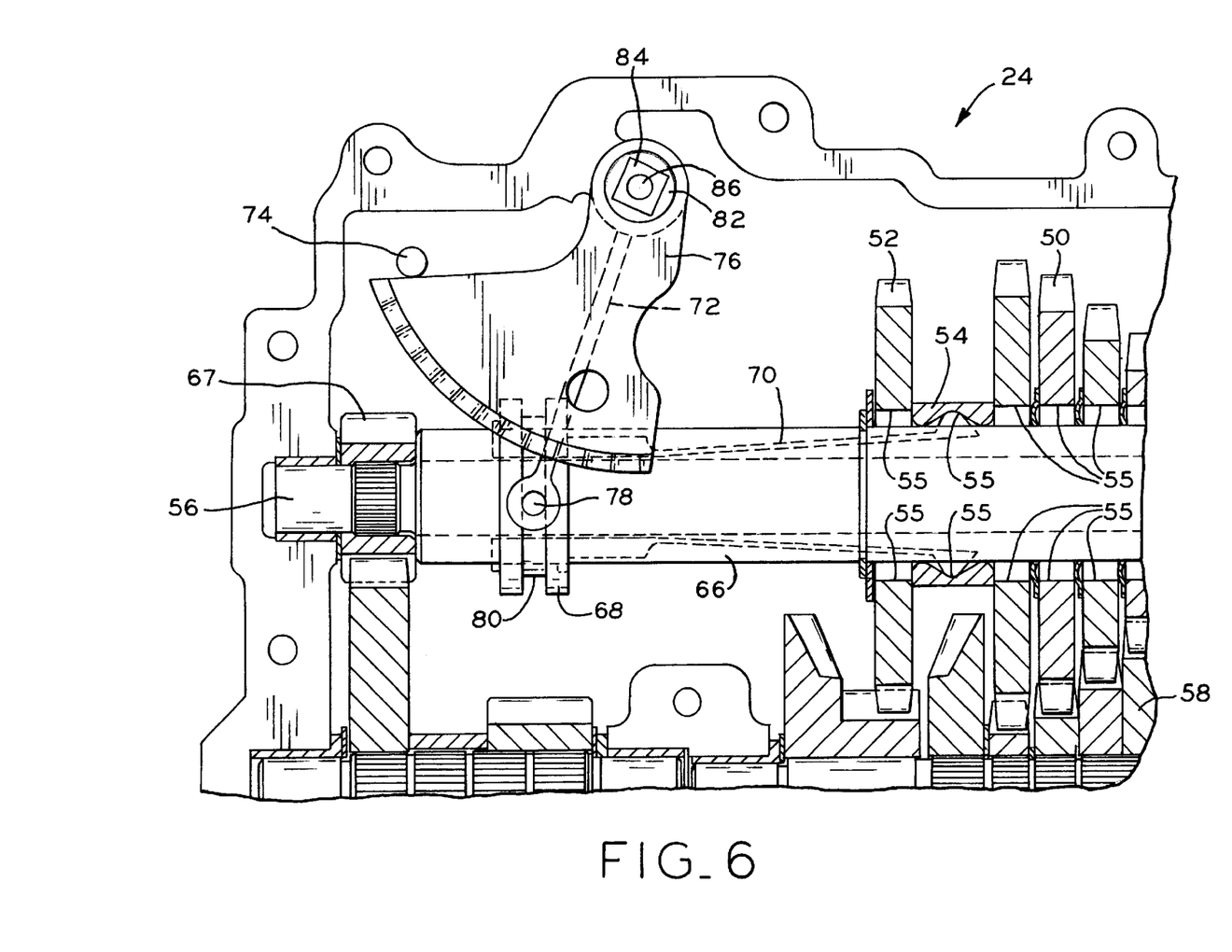
FIG. 6 is an enlarged fragmentary view of the transaxle of FIG. 3, the solenoid plunger shown in its extended position in which the shift mechanism is prevented from entering its reverse position.

Engaged with shift collar 68 is shift fork 72, which is rotatably fixed to shaft 82 (FIGS. 4 and 5). Plunger 74 of solenoid 32 extends into the casing of transaxle 24 near the shift mechanism. When shift fork 72 moves, plate 76 fixed thereto rotates in unison therewith as the different gears are selected. Plate 76 of the shift mechanism is limited in its range of rotation when plunger 74 is in its extended position. In that plunger position, plate 76 abuts plunger 74 as the shift mechanism is moved toward its reverse position and is thus prevented from moving into a position wherein the tines of key 70 engage recesses 55 of reverse gears 52. FIG. 6 shows the abutment of shift mechanism plate 76 with the solenoid plunger.

With reference to FIGS. 4 and 5, an enlarged fragmentary view of shift fork 72 and plate 76 is shown. As seen in FIG. 4, plate 76 and shift fork 72 share common keyway 130 in shaft 82. This sharing of common keyway 130 allows for plate 76 and shift fork 72 to move in unison as the operator rotates shaft 82 in selecting the drive gear. Key 132 is shown in FIG. 5 as connecting shift fork 72 to shaft 82 and keyway 130. Through the common movement of plate 76 and shift fork 72, when plate 76 abuts extended plunger 74, shift fork 72 is also prevented from moving any further toward the reverse position. Thus, shift fork 72 cannot move shift collar 68 into the reverse position and therefore, key 70 cannot engage reverse gear 52. However, when plunger 74 has been retracted, plate 76 is allowed to move beyond plunger 74, and shift fork 72 is able to move shift collar 68 such that the tines of key 70 may engage recesses 55 of reverse gear 52.

Figure 7:
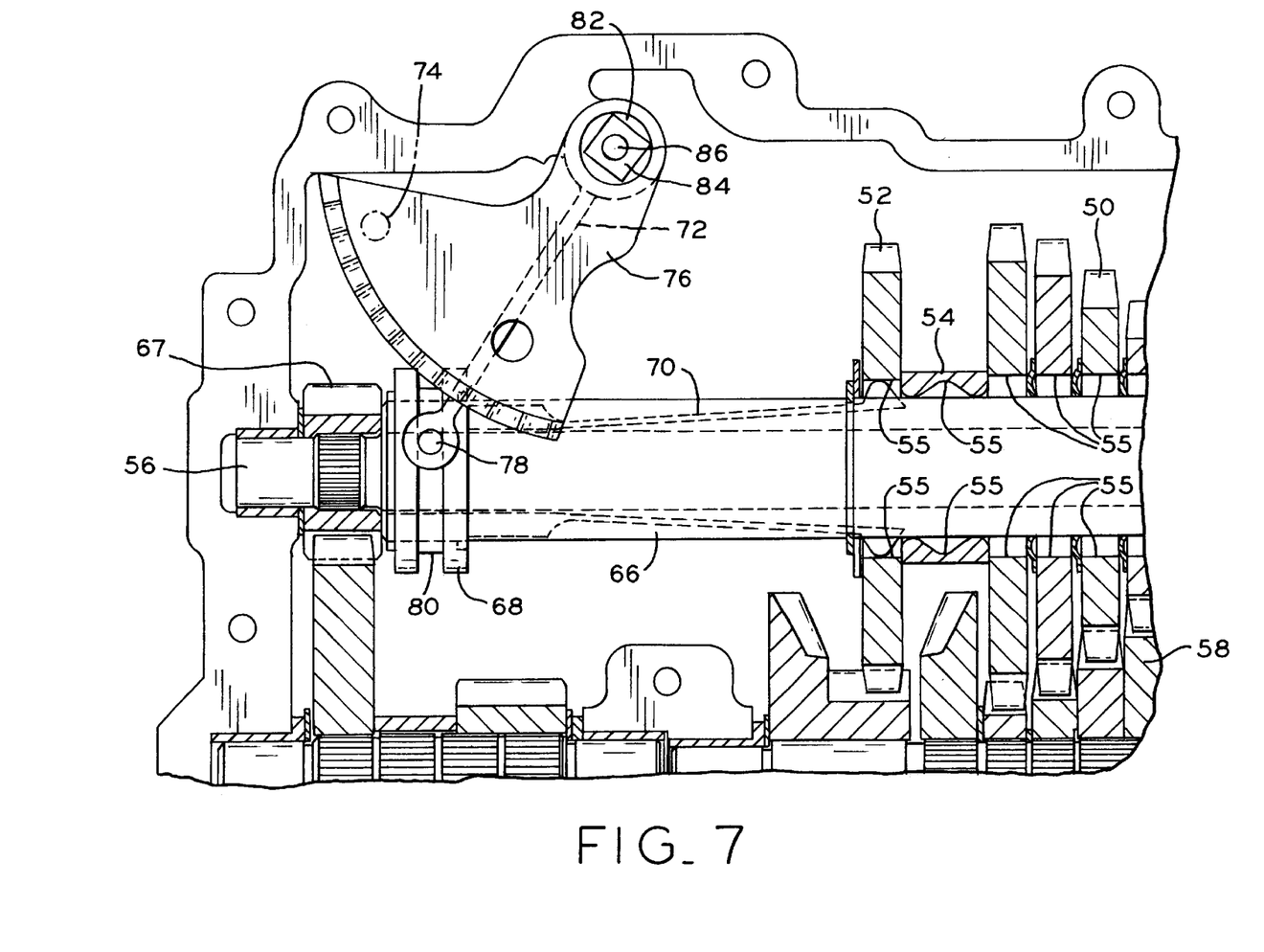
FIG. 7 is an enlarged fragmentary view of the transaxle of FIG. 3, the solenoid plunger shown in its retracted position in which movement of the shift mechanism into its reverse position is permitted.

Referring again to FIG. 6, shift fork 72 engages shift collar 68 by means of opposed pins 78 being received in groove 80 of shift collar 68. Both plate 76 and shift fork 72 are keyed to shaft 82, as shown in FIGS. 4 and 5, shaft 82 further having square end 84 and threaded recess 86 therein, to which shift lever 30 is mounted. Referring to FIG. 7, plunger 74 has been moved to its retracted position by solenoid 32, thereby allowing plate 76, shift fork 72 and shift collar 68 of the shift mechanism to move into the reverse position wherein the tines of key 70 may then engage recesses 55 of selected reverse gear 52, and mower 20 is thus able to be reversed.

Although transaxle 24 has been described as a manual shift transmission, mower 20 may instead include a hydrostatic transmission of a general type disclosed in U.S. Pat. No. 4,979,583, issued Dec. 25, 1990; U.S. Pat. No. 5,078, 659, issued Jan. 7, 1992; or U.S. Pat. No. 5,177,967, issued Jan. 12, 1993, all of which are assigned to the assignee of the present invention, the complete disclosures of which are expressly incorporated herein by reference. Alternatively, transaxle 24 may be a variator style of transmission, such as that disclosed in U.S. Pat. No. 4,768,997, issued Sep. 6, 1988, and assigned to the assignee of the present invention, the complete disclosure of which is expressly incorporated herein by reference.

Figure 8:
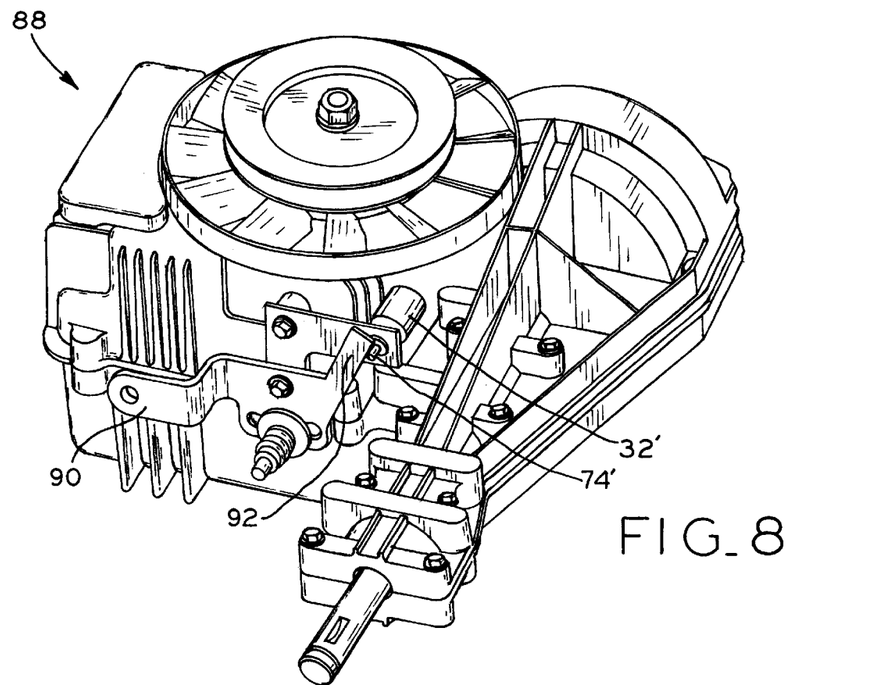
FIG. 8 is an oblique view of a hydrostatic transaxle including the inventive lockout feature, the solenoid plunger shown in its extended position in which the shift mechanism is prevented from entering its reverse position.
Figure 9:
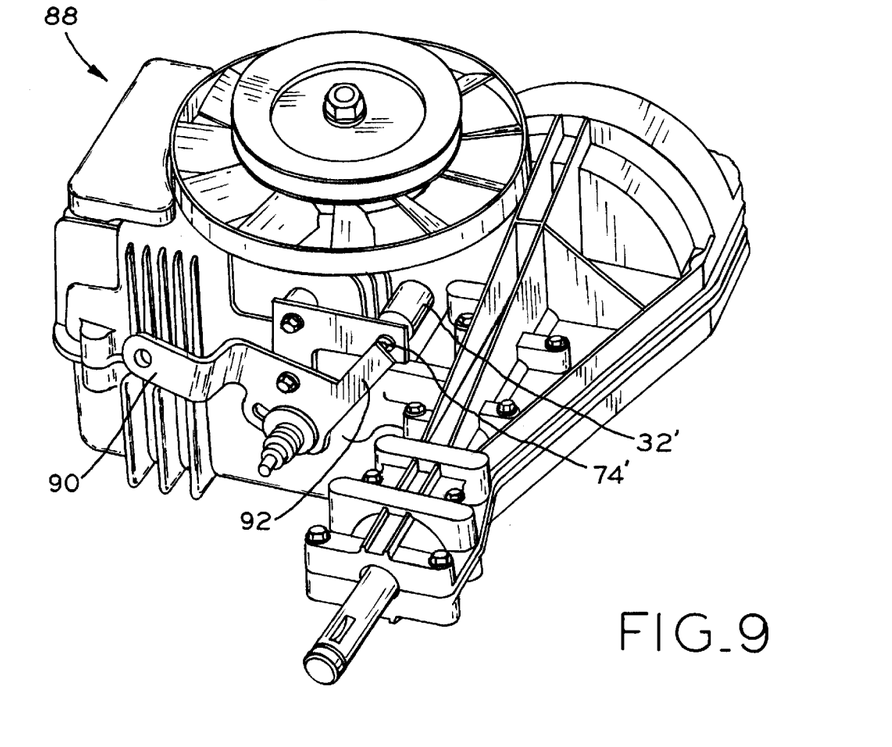
FIG. 9 is an oblique view of the hydrostatic transaxle of FIG. 8, the solenoid plunger shown in its retracted position in which movement of the shift mechanism into its reverse position is permitted.

FIGS. 8 and 9 show hydrostatic transmission 88 having a shift mechanism in which shift lever 90 moves a swash plate (not shown) or a track ring (not shown) to vary the hydrostatic pump displacement and the direction of fluid flow between the pump and the motor of the transmission. Shift lever 90 is integrally formed with flat metal piece or portion 92 which abuts plunger 74' of solenoid 32' when plunger 74' is in its extended position and the shift mechanism is moved toward its reverse position. The abutment of portion 92 with extended plunger 74' prevents hydrostatic transmission 88 from being shifted from neutral into reverse. In FIG. 9, plunger 74' of solenoid 32' is in its retracted position and portion 92 is able to move past retracted plunger 74' and into any one of its variable reverse positions.

Figure 10:
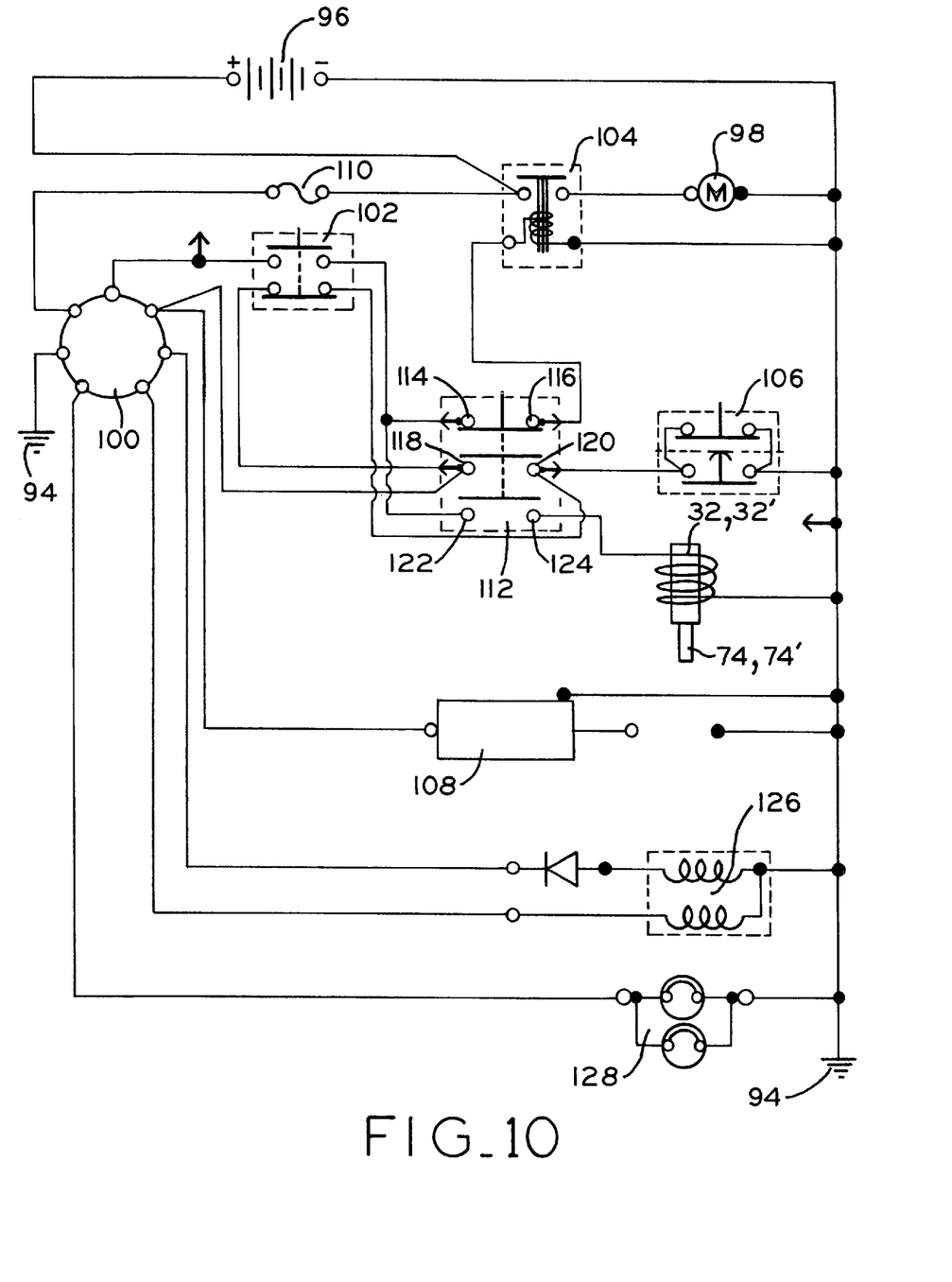
FIG. 10 is a schematic wiring diagram for the inventive lockout feature.

FIG. 10 shows the schematic wiring diagram for activating solenoid 32, 32'. As shown, the electrical system of mower 20 includes ground 94, battery 96, starter 98, ignition switch 100, ignition unit 108, alternator 126, headlights 128, and fuse 110. The electrical system also includes solenoid 104, which may be used for other operations associated with mower 20, clutch/brake switch 102, and seat switch 106. Clutch/brake switch 102 is shown in the position which represents the pedal being up, and seat switch 106 is shown in the position representing that the seat not being occupied by the operator of mower 20. Switch 112 is connected to clutch/brake switch 102 by terminals 114, 122, and 120. Switch 112 is connected to ignition switch 100 at terminal 118 and is connected to the seat switch 106 at terminal 120. Terminal 116 is connected to solenoid 104 and terminal 124 is connected to solenoid 32, 32' for actuation of plunger 74, 74'; each of the solenoids 104 and 32, 32' is further connected to ground 94.

As shown in FIG. 10, the switch portions between terminals 118 and 120 and between terminals 122 and 124 are open when the clutch pedal is up, as indicated by the position of clutch/brake switch 102, thereby breaking any electrical connection, while the switch portion between terminals 114 and 116 is closed, again when the clutch pedal is up, to provide electrical connection between clutch/brake switch 102 and solenoid 104.

In operation, when the operator starts mower deck 28 after engine ignition, the reverse switch 112 is closed between terminals 122 and 124 since clutch pedal is depressed to engage mower deck 28, such that current is applied to solenoid 32 and its windings are energized. Plunger 74 is biased into its retracted position, and through energizing the windings of solenoid 32, plunger 74 is extended, thereby preventing the operator from moving mower 20 into reverse. When mower deck 28 is not operating, or when the clutch pedal is up, the connection between terminals 122 and 124 is opened, and thus no current is applied to solenoid 32, the windings of the solenoid 32 are not energized, and plunger 74 is not extended. Unless the clutch pedal is depressed, or the mower deck is engaged, plunger 74 assumes its retracted position and mower 20 may be shifted into reverse by the operator.

While this invention has been described as having exemplary structures, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A lawn mower comprising:
   a frame;
   an engine having an electrical system and attached to said frame;
   a mower deck assembly having a rotating blade connected to said frame, said blade selectively engaged with said engine;
   a reversible transmission driven by said engine and comprising a shift mechanism having a forward position and a reverse position;
   a switch in electrical communication with said electrical system and mower deck assembly, said switch being in a first position when said blade is in engagement with said engine and in a second position when said blade is out of engagement with said engine; and
   a solenoid attached to said transmission and in electrical communication with said switch and having a plunger, said plunger being in an extended position when said switch is in its said first position wherein movement of said shift mechanism into its said reverse position is blocked by said plunger, said plunger being in a retracted position when said switch is in its said second position wherein movement of said shift mechanism into its said reverse position is not blocked by said plunger.

2. The lawn mower of claim 1, wherein said transmission is a transaxle having a transaxle casing and an axle being rotatably supported by said transaxle casing.

3. The lawn mower of claim 1, wherein said transmission is a manual shift transmission.

4. The lawn mower of claim 1, wherein said shift mechanism abuts said plunger when said plunger is in its said extended position and said shift mechanism is being moved toward its said reverse position, and said shift mechanism does not abut said plunger when said plunger is in its said retracted position or said shift mechanism is being moved toward its said forward position.

5. The lawn mower of claim 1, wherein said transmission is a hydrostatic transmission.

6. A lawn mower comprising:
   a frame;
   an engine having an electrical system and attached to said frame;
   a mower deck assembly connected to said frame and having a rotating blade, said blade being selectively engaged with said engine;
   a reversible transmission driven by said engine and comprising a shift mechanism having a forward position and a reverse position; and
   means for preventing said shift mechanism from being shifted into its reverse position when and because said blade is in engagement with said engine, said reversible transmission further comprising at least a portion of said means.

7. A lawn mower comprising:
   a frame;
   an engine having an electrical system and attached to said frame;
   a mower deck assembly connected to said frame and having a rotating blade, said
   blade being selectively engaged with said engine;
   a reversible transmission driven by said engine and comprising a shift mechanism having a forward position and a reverse position; and
   means for preventing said shift mechanism from being shifted into its reverse position when said blade is in engagement with said engine, said means for preventing including:
      a switch in communication with said electrical system and said mower deck assembly, said switch being in a first position when said mower deck assembly is engaged and in a second position when said mower deck assembly is not engaged; and
      a solenoid attached to said transmission and in electrical communication with said switch, said solenoid having a plunger;
      wherein said plunger is in an extended position when said switch is in its said first position and movement of said shift mechanism into its reverse position is blocked by said plunger, and said plunger is in a retracted position when said switch is in its said second position and movement of raid shift mechanism into its reverse position is not blocked by said plunger.

* * * * *